June 11, 1935.  D. K. HOPKINS  2,004,409
APPARATUS AND METHOD FOR FORMING SCREEN FROM WIRE
Filed Dec. 7, 1933   3 Sheets-Sheet 1
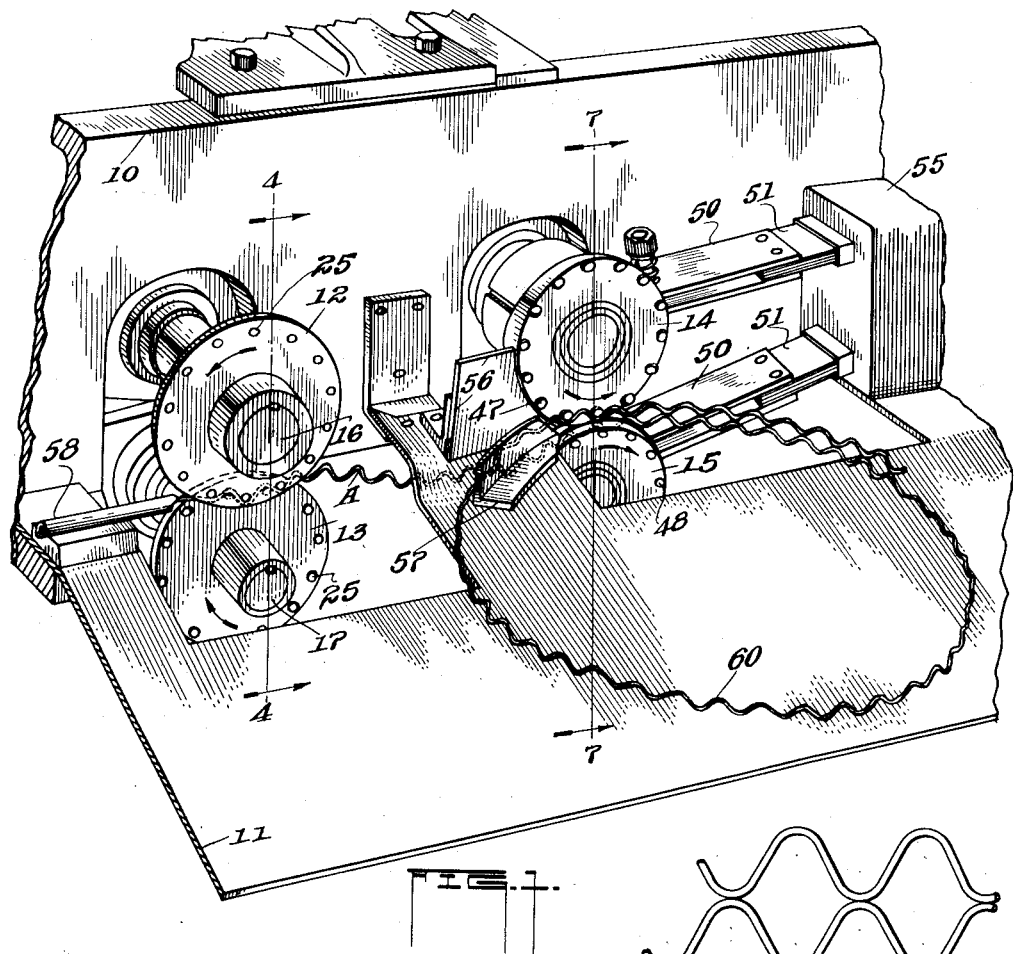
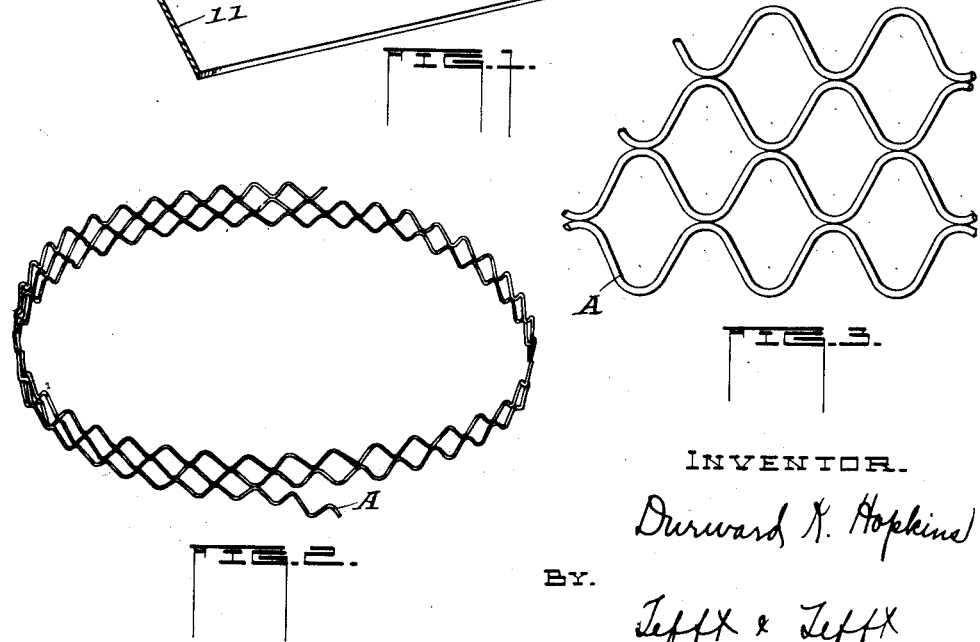
INVENTOR.
Durward K. Hopkins
BY
Tefft & Tefft
ATTYS.

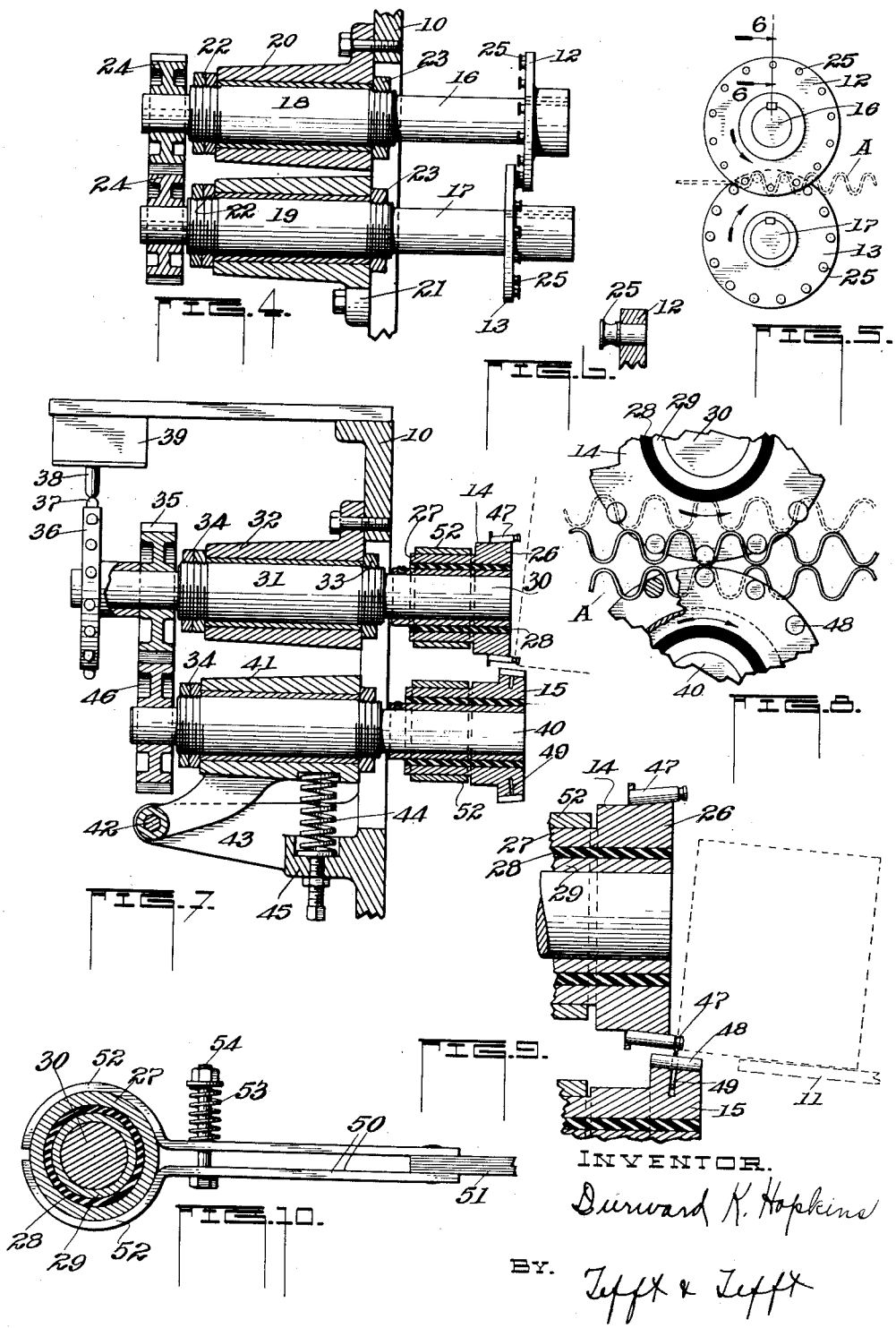

June 11, 1935.　　　D. K. HOPKINS　　　2,004,409
APPARATUS AND METHOD FOR FORMING SCREEN FROM WIRE
Filed Dec. 7, 1933　　　3 Sheets-Sheet 3

INVENTOR.
Durward K Hopkins
BY Tefft & Tefft
ATTYS.

Patented June 11, 1935

2,004,409

UNITED STATES PATENT OFFICE 2,004,409

APPARATUS AND METHOD FOR FORMING SCREEN FROM WIRE

Durward K. Hopkins, Peoria, Ill.

Application December 7, 1933, Serial No. 701,314

10 Claims. (Cl. 140—112)

This invention relates to apparatus for forming screen or the like from wire and has for one of its objects the provision of a means for forming wire screen in a continuous accumulative manner from a single strand of wire.

Another object is to provide means whereby a single strand of wire is continuously fashioned in such a manner as to be adapted to a subsequent operation producing a desired wire mesh construction.

A further object lies in the provision of apparatus capable of receiving the pre-formed wire strand and continuously and accumulatively placing portions thereof in contact with previously formed portions of itself to the end that the assembled portions form a screen or mesh material.

Another object is to provide electrical means for welding said contacting portions as the same are successively brought into contact whereby a screen or meshed material is produced.

Still another object is to produce a screen or meshed material having great strength and uniformity.

A still further object lies in the provision of means for producing mesh material without twisting or otherwise bending or interlocking the strands one upon the other.

An additional object lies in provision of means for producing mesh material wherein the wire is economically used with the result that a maximum amount of said material is produced from a given amount of wire.

Another object lies in the provision of a novel method of arranging and welding a strand or strands of wire to produce a wire mesh structure.

Other objects will appear in the following description and accompanying drawings, in which—

Fig. 1 is a front perspective view of essential portions of my device to be described;

Fig. 2 is a perspective view of a piece of the mesh material produced by the device;

Fig. 3 is an enlarged fragmental view of the same to be referred to;

Fig. 4 is a sectional side elevational view of wire forming elements taken on the line 4—4 in Fig. 1;

Fig. 5 is an end elevational view of portions of the same as viewed from the right in Fig. 4;

Fig. 6 is a fragmental sectional view taken from line 6—6 in Fig. 5;

Fig. 7 is a sectional side elevational view of essential portions of welding mechanism taken on the plane of line 7—7, Fig. 1;

Fig. 8 is an enlarged fragmental detail view of portions of the welding elements to be described;

Fig. 9 is an enlarged fragmental sectional side elevational view of welding elements to be described;

Fig. 10 is a sectional elevational view of brush members to be referred to;

Figure 11:
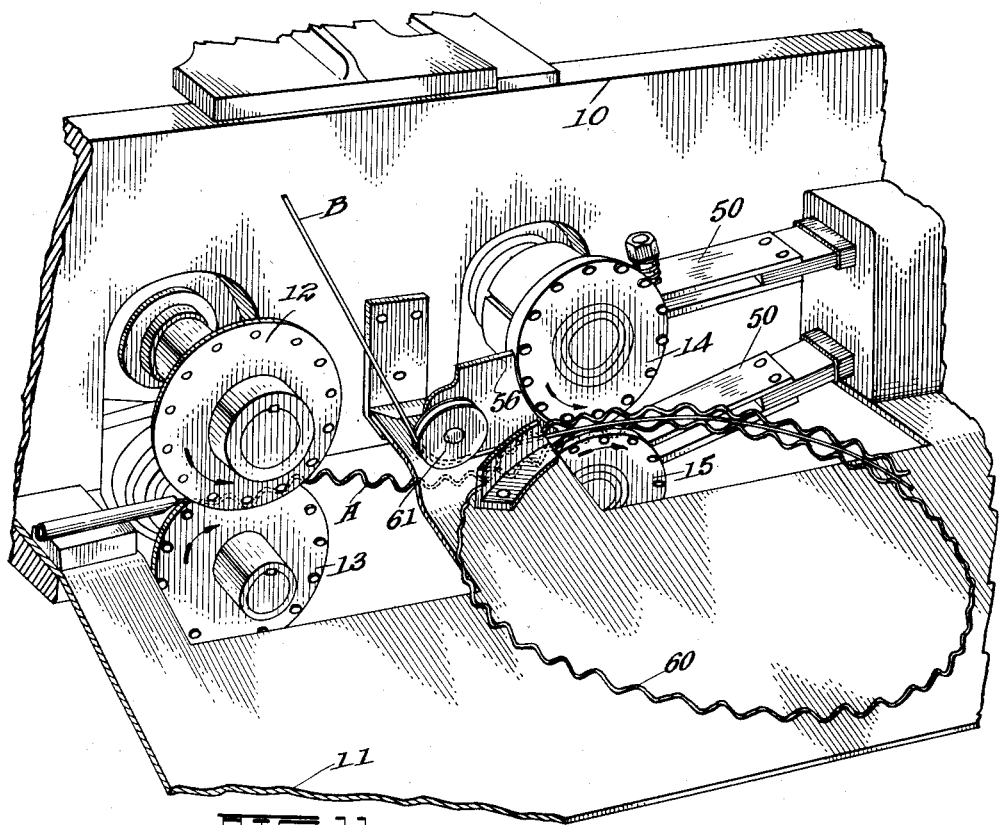
Fig. 11 is a view similar to Fig. 1, showing a modification of my mechanism as will be explained.

Before proceeding with the description of my apparatus, it is in order to state that the making of screen or other mesh materials from wire is an old and well known art. Also, it is well known that electric welding means have been extensively used in making such materials.

My device and method produce a mesh material made from wire by electric welding, a principle common to numerous others. However, I will disclose herein a novel mechanism and method for accomplishing the result.

Referring to the drawings, Fig. 1 discloses my device as generally comprising a support structure 10, a bench portion 11 extending therefrom, a pair of disk or wheel members 12 and 13 rotatably supported on the member 10 and a pair of head members 14 and 15 similarly supported and disposed a short distance from disks 12 and 13 in approximate horizontal line therewith.

Fig. 4 will show disks 12 and 13 to be affixed to horizontal shafts 16 and 17 respectively which are provided with enlarged portions 18 and 19, the latter being journalled in bracket members 20 and 21. Brackets 20 and 21 are supported upon the rear side of member 10.

Collars 22 and 23, screwed upon threaded portions of shaft portions 18 and 19, as shown, serve to retain the shafts against longitudinal movement in the support brackets.

To the rear ends of the shafts meshed spur gears 24 are secured by means of which the shafts, together with disks 12 and 13, are rotated synchronously in opposite directions.

Figs. 4 and 5 show that disks 12 and 13 are so disposed that their peripheries overlap somewhat and that disk 12 is disposed slightly forward of disk 13, whereby a small space is left between them.

The outer face of disk 13 and the opposing face of disk 12 are provided with a plurality of evenly spaced grooved studs 25 such as is shown in Fig. 6. The studs are arranged adjacent the peripheral line of the disks with the circular line of studs in disk 12 intersecting the line of those in disk 13 to bring about the relative positioning shown in Fig. 5.

The studs are so dimensioned in length as to pass within the gap between the disks without contact with the opposite disk and the grooves of the studs of one disk are so disposed as to align with those of the opposite disk.

Fig. 5 will illustrate that the studs of one disk are so disposed relative to those of the other as to pass between them in such a manner that with the disks rotating in the direction shown by arrows, a straight wire passed between the disks from left to right will alternately be acted upon by studs of either disk whereby the wire will be fashioned into a succession of wavelike loops.

Figs. 7 and 9 illustrate that head member 14 comprises a metallic body member 26 having a rearwardly extending tubular portion 27. Within the bore of the body portion is a lining member 28 made from insulating material. Within the insulator lining there is secured a sleeve member 29.

Sleeve 29, lining 28 and body 26 are secured together in such a manner as to form a unitary head member which has been designated 14.

The head member is secured, as by means of a set screw 29 to a shaft 30 which has an enlarged portion 31 similar to portion 18 of shaft 16.

Shaft 30 is journaled in a bracket 32 and is retained therein by collars 33 and 34, the journal and support mechanism being similar to that described in connection with shaft 16.

Upon the rearward end of the shaft is secured a spur gear 35 and a wheel member 36 which has a series of evenly spaced protrusions 37 so disposed as to engage a movable switch member 38 capable of operating a switching mechanism located in a casing 39 supported from support member 10 as indicated. The switch and its function will be referred to later.

The head member 15 is disposed below member 14. Its construction, except as will be noted later, is similar to that of head 14 and will therefore not be described in detail. It is secured to a shaft 40 similar to shaft 30 and is journaled in a special supporting member 41 which is pivotally supported at 42 from a bracket 43. A spring 44, supported from an extending portion 45 of member 10, urges the member 41 upwardly in such a manner that head 15 is resiliently urged toward head 14 for a purpose to be described.

A spur gear 46 is secured to shaft 40 in meshing relation with gear 35 whereby heads 14 and 15 are unitarily revolved as noted in connection with shafts 16 and 17.

Referring to heads 14 and 15, it will be noted that head 14 carries grooved pins or studs 47 disposed in evenly spaced relation about its periphery with the grooved ends extending somewhat beyond the face of the head.

Head 15 carries a series of pins or bars 48 inserted in evenly spaced relation in the circular face thereof. A continuous groove 49 is cut in the central portion of the circular face. Pins 48 lie across the groove to form a series of bars thereacross.

Fig. 9 illustrates that the circular faces of heads 14 and 15 together with studs 47 and bars 48 are angularly disposed relative to the axial line of the heads and that studs 47 extend somewhat forward of the front face of head 14 with the grooves of the studs aligning with groove 49. Fig. 8 indicates that studs 47 and bars 48 are so disposed as to lie opposite at the point of meeting.

Fig. 10 illustrates a brush member comprising dual half portions 50 secured to a laminated conductor 51 and having their opposite extremities fashioned into semicircular forms 52 which are adapted to slippably fit over the tubular portions 27 of the body members of heads 14 and 15. A spring 53, tensioned upon the upper half portion by means of a screw 54, urges the brush portions together in a yieldable manner.

Fig. 1 illustrates that a brush such as that just described is assembled with each of heads 14 and 15 with connectors 51 shown as leading into a casing 55 to be connected with the secondary terminals of a transformer for a purpose to be described.

It will be noted that a guide plate 56 is disposed in flush alignment with the face of head 14, also that an arcuate guide member 57 is disposed forwardly of the face line thereof.

Before describing the operation of the apparatus, it is in order to explain that for practical use the mechanism of disks 12 and 13 and heads 14 and 15 have their driving means, gear, chain or the like, connected in such a manner as to rotate the mechanisms synchronously. Suitable driving means are thought sufficiently conventional to obviate description herein.

Referring to Figs. 1, 5 and 8, it will be clear that with the mechanisms rotating in the direction shown by arrows, a straight wire fed to disks 12—13, as through a guide tube 58, will be projected thereby in crimped form, as explained in connection with Fig. 5 and designated A.

The crimped wire may now be placed to engage with the bars 48 of head 15 with the loops thereof occupying the groove 49, whereupon, due to the resilient pressure between the heads and resultant contact with studs 47, it will be continuously projected therefrom at the same speed as delivered by the crimping mechanism.

The free end of the wire is subsequently brought around to form a loop 60 as shown in Fig. 1, and reinserted above the freed strand A, whereby the loops of the wire are engaged upon studs 47, as shown in Fig. 8, in the grooves thereof as shown in Fig. 9.

Fig. 8 will make clear that the plural strands will thenceforth pass through the mechanism continuously with the tip portions of the loops of strand A, being successively brought into contact with similar portions of the reinserted strand. Resilient pressure is brought to bear on the contacting wire portions by means of spring 44 as already noted.

Mention has already been made of protrusions 37 of wheel 36 as effective to operate an electric switch. The protrusions are so disposed relative to studs 47 and bars 48 that the switch is operated to close its circuit temporarily at substantially the same moment that the wire strands are brought together.

In practical use, the switch is wired to control the primary circuit of a transformer having its secondary circuit connected with brushes 50 already noted.

Since the brushes are in electrical contact with insulated body members of heads 14 and 15, their meeting portions become electrodes whereby current is available, through the action of switch 39, to form a welded joint between the wire strands at each point of contact.

With the above in mind, it will be apparent that continued operation of the mechanism as described will result in continual rotation of loop 60 and continual addition thereto of the wire strand A.

By the above means and method there is built up a cylinder of mesh material from a helically arranged single strand of wire.

Fig. 9 shows a dotted outline of such a cylinder It will be noted that the angle of bench 11 approximately aligns with that of the studs 47 whereby the cylinder is tilted forwardly to clear the upper side of head 14.

Obviously, a cylinder of any usable length or diameter may be built up. By splitting the cylinder, sheets may be made having desired dimensions.

As a modification of the device and resultant mesh structure I show in Fig. 11 a mechanism similar to that in Fig. 1 with the addition of a grooved wheel 61 rotatably mounted adjacent heads 14 and 15. In Fig. 11 it is shown as supported upon guide plate 56.

A secondary wire strand B is guided in the groove of wheel 61 in such a manner as to be continuously inserted between strand A and the lower strand of the preceding convolution.

Figure 12:
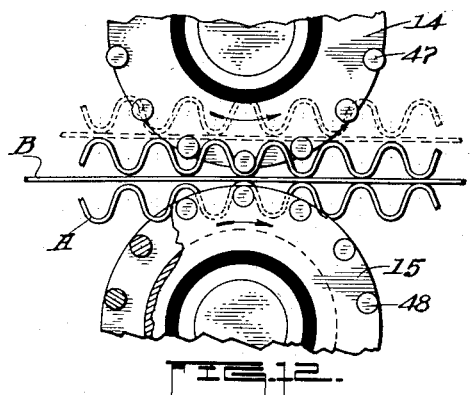
Fig. 12 is a fragmental detail view similar to Fig. 8, showing details of modified mechanism and wire arrangement.
Figure 13:
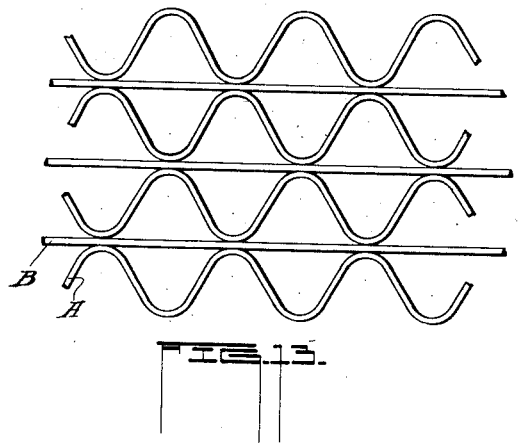
Fig. 13 is an enlarged view similar to Fig. 3, showing product made by the modified mechanism.

Operation of the mechanism is identical with that already described, with the exception that strand B, lying between the loops of the wire, as indicated best in Fig. 12, are included with the undulated strands, when the welding operation takes place, whereby three wires are welded instead of two and there is built up a mesh formation shown in Fig. 13.

With the foregoing in mind it will be apparent that my device may be modified to build up mesh structures having a variety of designs without alteration of the principle disclosed.

The particular wire form, mechanism and method of forming a mesh structure are herein shown for the purpose of illustration only. I do not wish to be limited in structure or principle except within the scope of the appended claims.

What I claim is:

1. A device of the class described having means for forming wire or the like into a series of undulated forms, in combination with means for continuously welding portions of said wire upon other portions thereof in a series of courses whereby a mesh structure is produced.

2. A device of the class described having in combination means for forming wire or the like into a series of undulated forms, means for placing portions of the undulations in contact with portions of other undulations and means for welding the contacting portions to form a mesh structure.

3. A method of making mesh material consisting of first continuously forming wire or the like into a strand having a series of undulated forms, substantially continuously moving the strand forward, turning the strand upon itself to form a closed circle thereof and to place portions of the undulations in contact with other portions of the same strand, successively welding the contacting portions, and continuously returning the strand upon itself and into contact with other portions of the moving strand while continuously welding the same as aforesaid, to the end that successive convolutions of the undulated strand are helically arranged and joined to form a mesh structure.

4. A device of the class described having means for forming a strand of wire or the like into a series of undulated forms lying upon a common plane, in combination with means for continuously welding portions of said wire upon an accompanying strand lying in a plane with said undulated forms in a series of courses whereby a mesh structure is produced.

5. A device of the class described having in combination means for forming a strand of wire or the like into a series of undulated forms lying upon a common plane, means for placing portions of the undulations in contact with another accompanying strand of wire lying in a plane with said undulated forms and means for welding the contacting portions to form a mesh structure the thickness of which does not exceed the diameter of the largest component strand.

6. A method of making mesh material consisting of placing strands of wire in contact at successive points along their length, welding the strands at the points of contact to form a welded structure comprising plural strands of wire, moving the plural strand structure forward, returning the same upon itself to form a closed figure thereof, welding the returned portion to a subsequently made portion at spaced points of contact, thereby continuously adding strands of the welded structure to formerly made strands thereof to produce a continuous body of welded wire material.

7. A device of the class described having dual moving electrode members adapted to receive and move plural strands of wire therebetween and to bring about welding of said strands together at spaced points thereon, whereby a plural stranded welded wire structure is produced, the electrodes being also adapted to receive a returned portion of said wire structure and to move and weld the same at spaced intervals upon a subsequently made portion thereof and to continuously move and weld one portion upon another to form a wire mesh material.

8. A device of the class described having opposed revoluble head members, said head members having positioned therein energized contact members synchronously positioned with respect to each other, said head members being suitably insulated with respect to each other and having a yielding relationship whereby the position of said head members relative to each other is controlled, said revoluble heads being arranged to receive a product of manufacture preferably strands of undulated wire, one of said heads being provided with a groove-like opening capable of partially recessing said undulated wire, said head being provided with equally spaced contact members, said contact members co-operating with the groove in controlling the entry of said undulated wire between the head members and co-operating with the contact members of the opposing head member to pass said wire strand between and through said heads.

9. A device of the class described having opposed revoluble head members, said head members having positioned therein energized contact members synchronously positioned with respect to each other, said head members being suitably insulated with respect to each other and having a yielding relationship whereby the position of said head members relative to each other is controlled, said revoluble heads being arranged to receive a product of manufacture preferably strands of undulated wire, one of said heads being provided with a groove-like opening capable of partially recessing said undulated wire, said head being provided with equally spaced contact members, said contact members co-operating with the groove in controlling the entry of said undulated wire between the head members and co-operating with the contact members of the opposing head member to pass said wire strand between and through said heads, and crimping mechanism co-operative with said head members for producing said undulated wire strand.

10. A device of the class described having means for continuously feeding a strand of wire for the purpose of constructing a wire mesh material comprising means for fashioning a strand of wire into a series of undulated forms, plural revoluble members having electrode portions spaced apart thereon in such a manner as to complement said undulations, said revoluble members being so disposed as to receive the wire strand between them whereby said electrodes engage said undulations in geared relationship to propel the wire strand forward continuously.

DURWARD K. HOPKINS.